(12) United States Patent
Schein

(10) Patent No.: US 11,473,929 B2
(45) Date of Patent: Oct. 18, 2022

(54) VEHICLE EVENT IDENTIFICATION

(71) Applicant: Ford Global Technologies, LLC, Dearborn, MI (US)

(72) Inventor: Victoria Leigh Schein, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 16/494,345

(22) PCT Filed: Mar. 16, 2017

(86) PCT No.: PCT/US2017/022632
§ 371 (c)(1),
(2) Date: Sep. 16, 2019

(87) PCT Pub. No.: WO2018/169534
PCT Pub. Date: Sep. 20, 2018

(65) Prior Publication Data
US 2020/0132504 A1    Apr. 30, 2020

(51) Int. Cl.
| | | |
|---|---|---|
| G01C 21/36 | (2006.01) | |
| G08G 1/01 | (2006.01) | |
| G08G 1/0967 | (2006.01) | |
| G08G 1/04 | (2006.01) | |

(52) U.S. Cl.
CPC ..... *G01C 21/3691* (2013.01); *G01C 21/3697* (2013.01); *G08G 1/012* (2013.01); *G08G 1/0133* (2013.01); *G08G 1/0141* (2013.01); *G08G 1/04* (2013.01); *G08G 1/09675* (2013.01); *G08G 1/096708* (2013.01)

(58) Field of Classification Search
CPC ............ G01C 21/3691; G01C 21/3697; G08G 1/012; G08G 1/0133; G08G 1/0141; G08G 1/04; G08G 1/096708; G08G 1/09675
See application file for complete search history.

(56) References Cited

U.S. PATENT DOCUMENTS

| | | | | |
|---|---|---|---|---|
| 7,277,028 | B1 * | 10/2007 | Janke | ............. G08G 1/164 340/995.13 |
| 8,177,182 | B1 | 5/2012 | Wood et al. | |
| 8,825,374 | B2 * | 9/2014 | Dimitriadis | ........ G01C 21/3691 701/411 |

(Continued)

FOREIGN PATENT DOCUMENTS

| | | | |
|---|---|---|---|
| CN | 202306831 U | * | 7/2012 |
| DE | 102014006518 A1 | | 11/2015 |
| WO | 2015041864 A1 | | 3/2015 |

OTHER PUBLICATIONS

Notification of Transmittal of International Search Report and Written Opinion of International Searching Authority dated Jun. 9, 2017 regarding International Application No. PCT/US2017/022632 (10 pages).

*Primary Examiner* — Peter D Nolan
*Assistant Examiner* — Demetra R Smith-Stewart
(74) *Attorney, Agent, or Firm* — Brandon Hicks; Bejin Bieneman PLC

(57) ABSTRACT

A plurality of prompts, each associated with a road event, are presented on a display upon receiving a first input on an input device. A second input selecting the prompts is received on a second input device. A message is sent with the selected prompts and a location of a vehicle.

18 Claims, 4 Drawing Sheets

(56) References Cited

U.S. PATENT DOCUMENTS

| | | | |
|---|---|---|---|
| 9,212,930 B2 * | 12/2015 | Tayar | G09B 29/007 |
| 2008/0059051 A1 * | 3/2008 | Kumagai | G08G 1/0104 |
| | | | 701/117 |
| 2008/0255754 A1 * | 10/2008 | Pinto | G01C 21/3691 |
| | | | 701/119 |
| 2010/0198508 A1 | 8/2010 | Tang | |
| 2010/0312462 A1 * | 12/2010 | Gueziec | G08G 1/0967 |
| | | | 345/173 |
| 2014/0257986 A1 * | 9/2014 | Macartney-Filgate | |
| | | | G06Q 30/0258 |
| | | | 705/14.56 |
| 2014/0267066 A1 | 9/2014 | Kolehmainen | |
| 2015/0025755 A1 | 1/2015 | Willgert et al. | |
| 2015/0054760 A1 | 2/2015 | Amaru et al. | |
| 2015/0347478 A1 * | 12/2015 | Tripathi | G06F 16/2246 |
| | | | 707/743 |
| 2016/0133130 A1 | 5/2016 | Grimm et al. | |
| 2016/0156773 A1 | 6/2016 | Chanda | |
| 2016/0210857 A1 * | 7/2016 | Gao | G08G 1/166 |
| 2016/0320900 A1 * | 11/2016 | Nabe | G06F 3/1454 |
| 2017/0024369 A1 | 1/2017 | Seagraves et al. | |
| 2017/0053461 A1 * | 2/2017 | Pal | G08G 1/012 |
| 2017/0062725 A1 * | 3/2017 | James | C08G 61/12 |
| 2017/0098372 A1 * | 4/2017 | Eilertsen | G08G 1/096775 |
| 2018/0068495 A1 * | 3/2018 | Chainer | B62D 15/025 |

* cited by examiner

VEHICLE EVENT IDENTIFICATION

BACKGROUND

Vehicles traveling on roadways may encounter obstacles that can impede operation of the vehicle. For example, animals crossing a roadway may require a user to apply a brake to stop the vehicle. An autonomous vehicle that encounters the obstacle can detect the obstacle and can actuate components to change vehicle operation to address the obstacle. Furthermore, an operator of a non-autonomous or partially autonomous vehicle can identify the obstacle and actuate components to address the obstacle. However, obstacles may pose a danger to vehicle other than the vehicle detecting and possibly navigating to avoid the obstacle.

DETAILED DESCRIPTION

Figure 1:
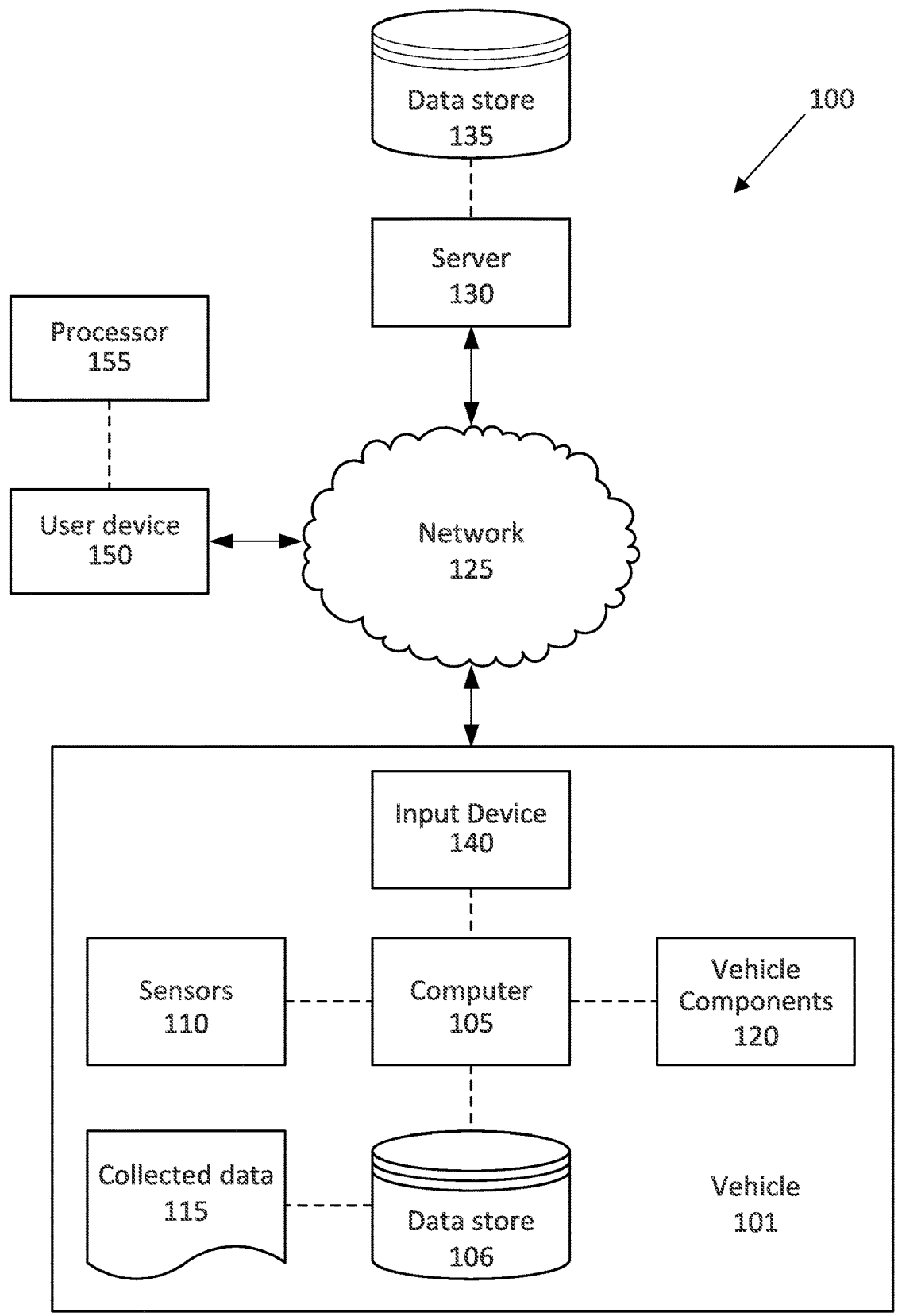
FIG. 1 is a block diagram of an example system for identifying an event.

A system includes a computer programmed to present a plurality of prompts, each associated with a road event, on a display upon receiving a first input on an input device, receive a second input selecting the prompts on a second input device, and send a message with the selected prompts and a location of a vehicle.

The computer can be further programmed to present the prompts based on a size of the vehicle.

The input device can be mounted to one of a steering wheel and an instrument panel.

The input device can include a plurality of buttons, and each button is programmed to select one or more of the prompts.

The computer can be further programmed to select one of the prompts upon receiving the input on the input device.

The computer can be further programmed to present the prompts based on a location of the vehicle.

The computer can be further programmed to present the prompts based on data from a vehicle sensor.

The computer can be further programmed to adjust a route of the vehicle based on the message.

The computer can be further programmed to receive a second message and, based on the second message, actuate a vehicle component.

The system can further include a second computer in a second vehicle, the second computer programmed to actuate a second vehicle component based on receipt of the message.

A method includes presenting a plurality of prompts, each associated with a road event, on a display in a vehicle upon receiving an input on an input device, receiving a second input selecting the prompts on the display, and sending a message with the selected prompts and a location of a vehicle.

The method can further include presenting the prompts based on a size of the vehicle.

For the method, the input device can be mounted to one of a steering wheel and an instrument panel.

For the method, the input device includes a plurality of buttons, and each button is programmed to select one or more of the prompts.

The method can further include selecting one of the prompts upon receiving the input on the input device.

The method can further include presenting the prompts based on a location of the vehicle.

The method can further include presenting the prompts based on data from a vehicle sensor.

The method can further include adjusting a route of the vehicle based on the message.

The method can further include receiving a second message and, based on the second message, actuating a vehicle component.

The method can further include actuating a second vehicle component in a second vehicle based on receipt of the message.

Further disclosed is a computing device programmed to execute any of the above method steps. Yet further disclosed is a vehicle comprising the computer. Yet further disclosed is a computer program product, comprising a computer readable medium storing instructions executable by a computer processor, to execute any of the above method steps.

As used herein, an "event" is a detection of one or more identified objects on or near a roadway. That is, the objects can cause a disruption of typical operation of the vehicle on the roadway, and by identifying the objects and broadcasting the event identified from the objects to one or more other vehicles, the other vehicles can avoid the objects. Example events include, e.g., detection of an obstacle such as a pothole or downed tree, a crash scene, a lane closure, an animal crossing, potholes, construction, etc.

FIG. 1 illustrates a system 100 for identifying an event near a vehicle 101. A computer 105 in the vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of a target, projecting a path of a target, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, and the like.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, BLE, IEEE 802.11, vehicle-to-vehicle (V2V) such as Dedicated Short Range Communications (DSRC), etc.), local area networks (LAN) and/or wide area networks (WAN), including the Internet, providing data communication services.

The system 100 includes an input device 140. The input device 140 can be a device that sends a message over the network 125 to the computer 105 and/or the user device 150 to present one or more display items to allow the user to tag the event. The input device 140 can be, e.g., a push-button, a wearable device (e.g., a smartwatch), etc. For example, the input device 140 can be a push-button that includes a base fixed to the steering wheel 205, an actuator movable connected to the base, and a transmitter between the base and the actuator. When the user depresses the actuator, the transmitter sends a message over the network 125 (e.g., BLE) to the computer 105 indicating that the user intends to tag an event 200. The input device 140 can be fixed to one of the vehicle components 120, e.g., the steering wheel, the instrument panel, etc. The input device 140 can receive input from the user when the user notices an event to be tagged.

For example, the input device 140 could include a multi-modal mechanical push button and/or a capacitive touch sensitive button and/or a gesture controlled human interface device reachable by the user in the vehicle 101. The input device 140 can receive user input from the user and could be arranged in the vehicle 101 for the user to touch or push without looking away from the road while driving. The input device 140 can be installed or mounted in the vehicle 101 by the user with one or more attachment mechanisms, e.g., a strap, an adhesive, a steering wheel clamp, etc., that allows the input device 140 to be accessible, multi-modal, and/or safe to implement.

The system 100 may include a user device 150. As used herein, a "user device" is a portable, non-input computer that includes a memory, a processor, a display, and one or more input mechanisms, such as a touchscreen, buttons, etc., as well as hardware and software for wireless communications such as described herein. That the user device 150 is "non-input" means that it is not provided with any structure to be worn on a person's body or attached to a vehicle component 120; for example, a smart phone user device 150 is not of a size or shape to be fitted to a person's body and typically must be carried in a pocket or handbag, and could be worn on a person's body only if it were fitted with a special case, e.g., having an attachment to loop through a person's belt, and hence the smart phone user device 150 is non-input. Accordingly, the user device 150 may be any one of a variety of computers including a processor and a memory, e.g., a smartphone, a tablet, a personal digital assistant, etc. the user device 150 may use the network 125 to communicate with the vehicle computer 105 and the input device 140. For example, the user device 150 and input device 140 can be communicatively coupled to each other and/or to the vehicle computer 105 with wireless technologies such as described above. The user device 150 includes a user device processor 155.

Furthermore, the user device processor 155 could be programmed to log and save location and concurrent sensor 110 data 115 locally or at remote location, e.g., the server 130, when input is given to the input device 140. The user device processor 155 could receive a message from the input device 140 over the network 125 (e.g., BLE).

Figure 2:
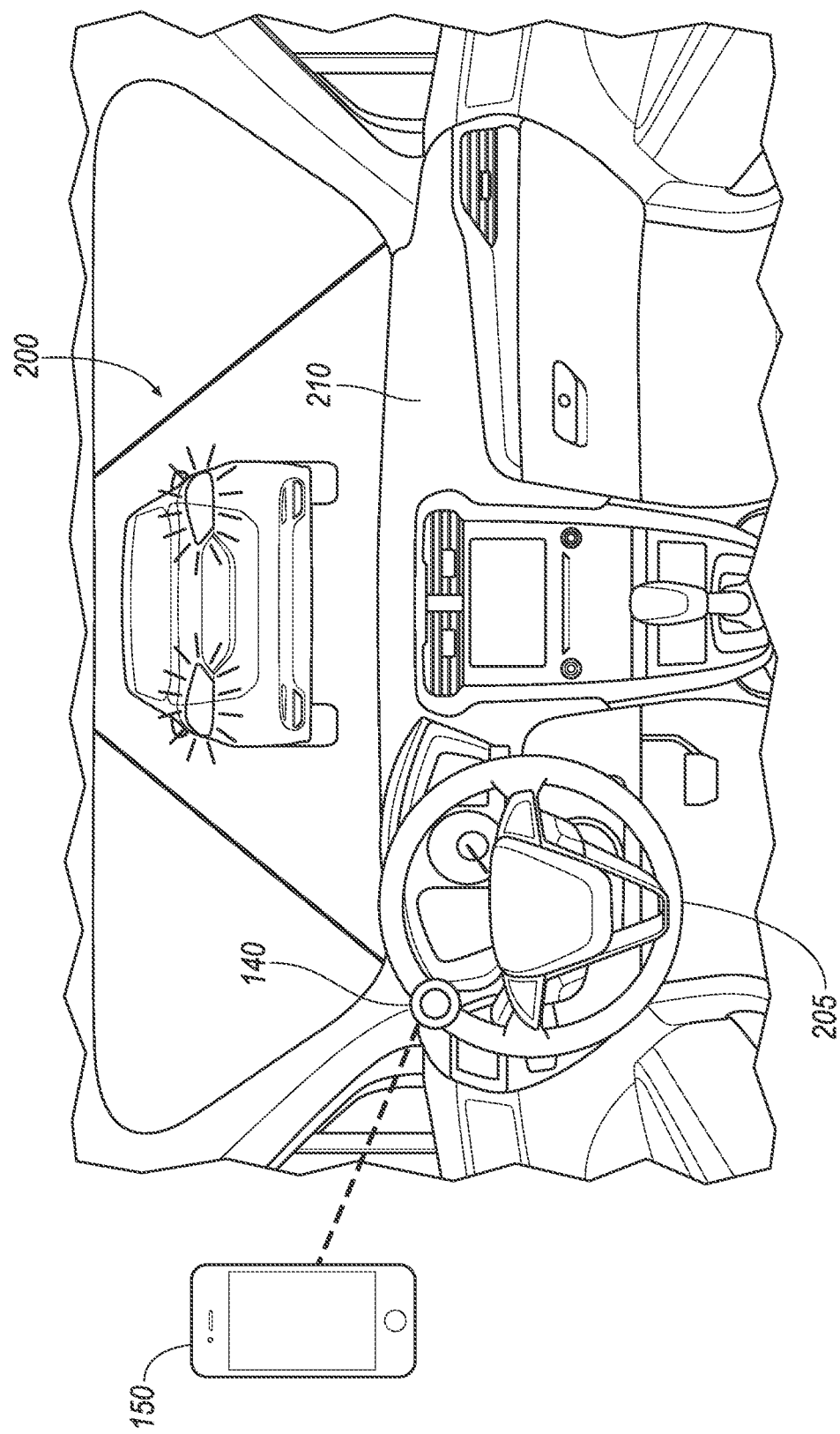
FIG. 2 illustrates an example input device for identifying the event.

FIG. 2 illustrates an example input device 140 installed in the vehicle 101. The input device 140 can be a push button, as shown in FIG. 2. That is, the input device 140 can include a movable button that, when depressed, sends a message over the network 125 to the computer 105 and/or the user device processor 155 indicating that the button on the input device 140 has been depressed. The input device 140 can receive input (e.g., depressing the button) from the user to instruct the computer 105 and/or the user device processor 155 that the user intends to identify an event 200. Upon receiving the input, the input device 140 can send a message to the user device processor 155 over the network 125 (e.g., Bluetooth®, BLE, etc.) to provide one or more tags to the user to identify the event 200. Alternatively or additionally, the input device 140 can be a device with a touchscreen display, e.g., a wearable smartwatch, a dedicated event 200 tagging device, etc. Furthermore, the input device 140 can include a plurality of buttons, and each button can be programmed to select one or more prompts, as described below.

As shown in FIG. 2, the input device 140 can be mounted to a steering wheel 205. The input device 140 can be mounted to the steering wheel 205 with, e.g., an adhesive, a fastener, etc. Alternatively or additionally, the input device 140 can be mounted to an instrument panel 210. That is, the input device 140 can be mounted to a surface in the vehicle 101 that is readily reachable by the user. Thus, the user can readily provide input to the input device 140 when the user wants to identify the event 200. Alternatively or additionally, the input device 140 can be installed in the steering wheel 205, e.g., in one of the spokes of the steering wheel 205, such that the input device 140 presents a class-A surface. That is, the steering wheel 205 can include a plurality of mechanisms for controlling vehicle components 120, e.g., a volume control for an entertainment component, a speed control for an adaptive cruise control, etc., and one of the mechanisms installed in the steering wheel 205 can be the input device 140 to identify the event 200.

Upon tagging the event 200 and sending the message, the computer 105 can be programmed to actuate one or more vehicle components 120. For example, the computer 105 can adjust a route of the vehicle 101 when the event 200 is, e.g., a stopped vehicle 101 as shown in FIG. 2, and can actuate a propulsion 120 to move the vehicle 101 along the new route. In another example, the computer 105 can actuate a brake 120 to stop the vehicle 101 based on the event 200.

The computer 105 can be programmed to receive a message from another vehicle 101. Based on the message, the computer 105 can actuate a vehicle component 120. That is, other vehicles 101 can tag events 200 and send messages with the tagged events 200 over the network 125. Upon receiving the message with the tagged event 200, the computer 105 can determine whether to adjust operation of the vehicle 101. For example, if the event 200 is a construction zone, the computer 105 can actuate a propulsion and a brake to move the vehicle 101 along an alternate route that avoids the construction zone.

FIG. 3 illustrates example prompts 215 to tag the event 200. The prompts 215 are text boxes and/or images or icons that describe the event 200. That is, when a user sees the prompts 215 selected by another user, the user can identify the event 200 based on the selected prompts 215. The computer 105 can be programmed to present a plurality of prompts 215 on a display in the vehicle 101 upon receiving an input on the input device 140. The display can be, e.g., a vehicle 101 HMI, a display on the user device 150, etc. the display can receive another input selecting the prompts 215 on the display. The computer 105 can be programmed to send a message over the network 125 with the selected prompts 215 and a location of the vehicle 101.

Figure 3C:
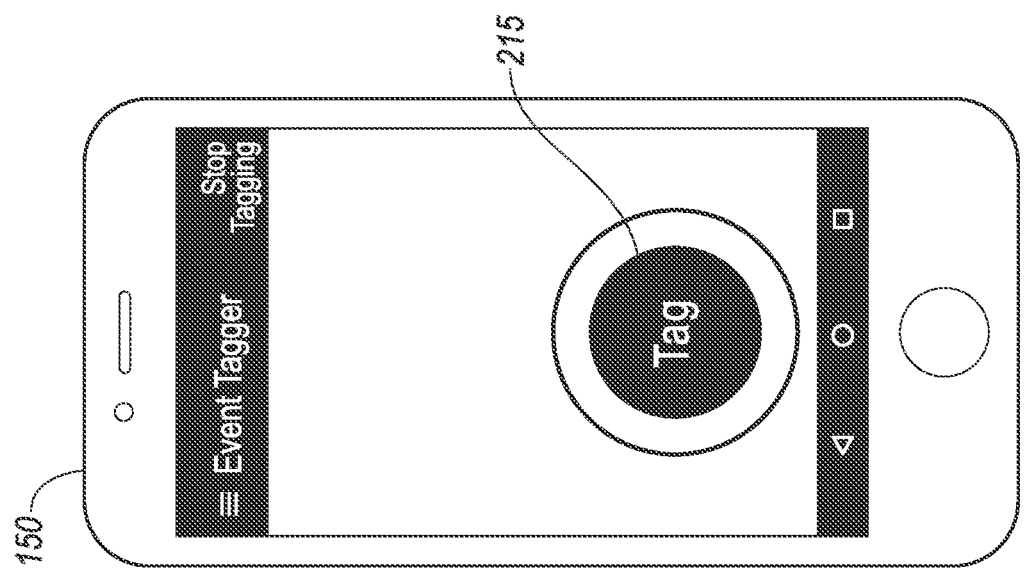
FIGS. 3A-3C illustrate example tags for identifying the event.
Figure 3B:
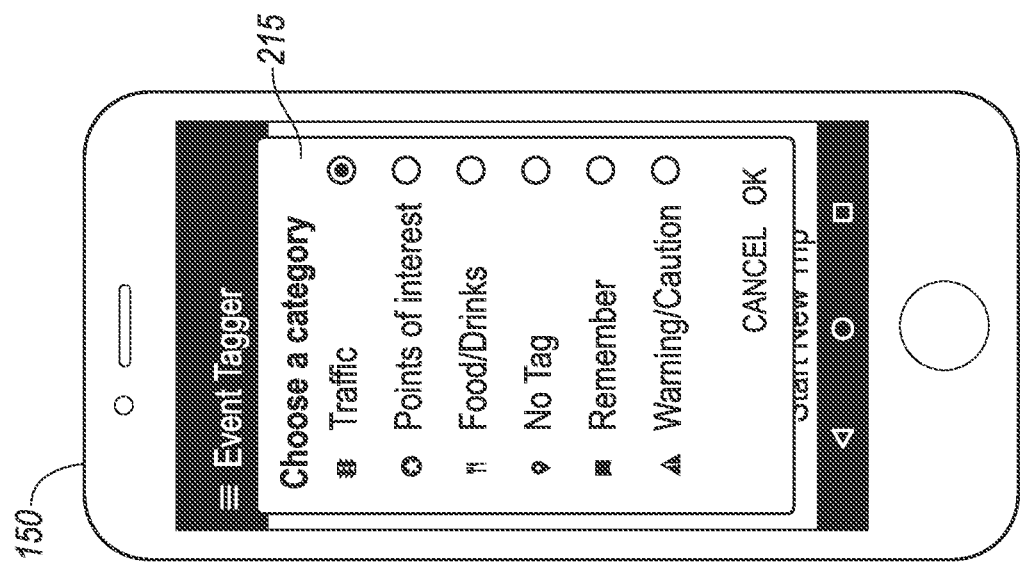
Figure 3A:
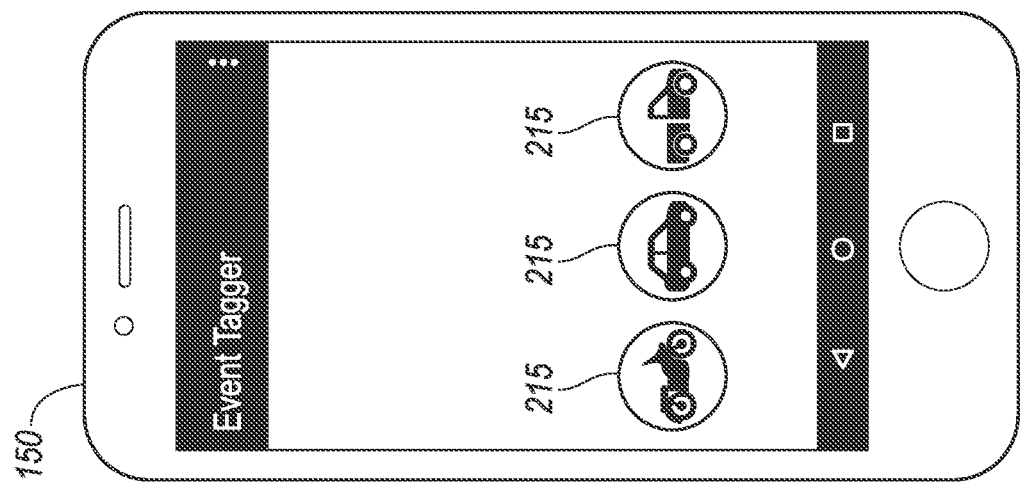

The computer 105 can present prompts 215 based on a size of the vehicle 101, as shown in FIG. 3A. That is, as described above, the event 200 can be described with different prompts 215 if the vehicle 101 is a large vehicle 101, e.g., a truck or a bus, rather than a smaller vehicle 101, e.g., a sedan. The computer 105 can present a set of prompts 215 asking the user to select the size of the vehicle 101, e.g., a motorcycle, a sedan, a truck, etc. The prompt 215 indicating the size of the vehicle 101 can be sent in the message over the network 125. Thus, when another vehicle 101 receives the selected prompts 215, the operator can determine whether the prompts 215 would affect operation of the another vehicle 101. For example, if the user is operating a sedan, and the prompt 215 in a received message indicates the event 200 is a difficult turn and that the prompt 215 was sent from a truck, the user can determine that the event 200 may not be as difficult for the sedan, and may continue operation of the vehicle 101. Alternatively or additionally, if the user is operating a truck, the user can adjust operation of the truck when receiving a message with a prompt 215 indicating that the message was sent from another truck. Furthermore, the computer 105 may be programmed to select one or more prompts 215 upon receiving the input on the input device 140. For example, the computer 105 can select one of the prompts 215 indicating the size of the vehicle 101.

The computer 105 can present the prompts 215 based on a location of the vehicle 101. The computer 105 can collect geo-location data 115 to determine the location of the vehicle 101. The computer 105 can further receive data 115 from the server 130 about potential events 200 near the vehicle 101. For example, if the location of the vehicle 101 is a highway, the computer 105 can present prompts 215 indicating events 200 that typically occur on highways, e.g., traffic, accidents, etc.

The computer 105 can present the prompts 215 based on data 115 collected from one of the sensors 110. As the computer 105 collects data 115 with the sensors 110, the computer 105 can determine that one or more prompts 215 associated with the data 115 could be displayed on the user device 150. For example, if the computer 105 collects image data 115 from a camera 110 that indicates the presence of an object ahead of the vehicle 101 that can impede progress of the vehicle 101 (e.g., a traffic cone), the computer 105 can determine to display a prompt 215 to urge the user to identify the object and the event 200 associated with the object (e.g., a construction zone).

As shown in FIG. 3B, the computer 105 can instruct the user device 150 to display a plurality of prompts 215 indicating specific categories of events 200. The categories can be predetermined common prompts 215 stored in the user device 150 and/or the server 130. The user can select one of the prompts 215 listed on the user device 150 display to tag the event 200. That is, the user can determine that the event 200 can be described with one of the categories described by the prompts 215 shown in FIG. 3B, and can select the prompt 215 that corresponds with the event 200.

As shown in FIG. 3C, the user can provide custom input to identify the event 200. That is, the user can determine that the event 200 may require input that is not shown on the user device 150 display. The computer 105 can provide a prompt 215 to allow the user to provide custom input with the user device 150. Upon selecting the prompt 215, the user device processor 155 can receive input from the user. For example, the user device processor 155 can display a keyboard to receive a text input from the user. In another example, the user device processor 155 can actuate a microphone in the user device 150 to receive an audio input from the user. In another example, the user device processor 155 can actuate a camera in the user device 150 to receive a visual input from the user. Upon receiving the custom user input, the user device processor 155 can send the input to the computer 105. The computer 105 can use known techniques to analyze the input. For example, the computer 105 can use known text-parsing techniques on the user audio input to generate one or more text phrases from the audio input.

The computer 105 can be programmed to automatically select one or more prompts 215. That is, upon providing input to the input device 140, in addition to displaying prompts 215 on the user device 150 display, the computer 105 can store one or more preselected prompts 215. The preselected prompts 215 can be determined based on instructions programmed prior to embarking on the route and/or stored in the server 130. For example, the computer 105 can be programmed to select one of the prompts 215 indicating a size of the vehicle 101, as shown in FIG. 3A, when the user provides input to the input device 140. By preselecting prompts 215 upon receiving input on the input device 140, the computer 105 can provide information about the event 200 with fewer prompts 215 actively selected by the user. That is, the user may only be able to select a specific number of prompts 215 to tag the event 200 before operating the vehicle 101 to address the event 200. By preselecting prompts 215 that are common to the vehicle 101 (e.g., the size of the vehicle 101), the computer 105 can provide more detailed prompts 215 to the user to more accurately describe the event 200.

An example event 200 can be a left turn at a busy intersection. The user can notice that the left turn can require moving across more than one lane of traffic with other vehicles 101 moving across the path of the vehicle 101. If the vehicle 101 is a truck or a bus, the vehicle 101 may wait at the intersection for a longer period of time to turn than, e.g., a sedan. Thus, the user can provide input to the input device 140 and select prompts 215 indicating that (1) the vehicle 101 is a truck, (2) the event 200 is a left turn, and (3) that the turn is difficult. Thus, upon sending the message with the prompts 215, other vehicles 101 that are trucks can adjust one or more vehicle components 120 to avoid the intersection to avoid the difficult turn.

In another example, the event 200 can be a construction zone. That is, when a portion of a roadway is under construction, one or more roadway lanes may be blocked from use by vehicles 101. Smaller vehicles 101, e.g., sedans, can navigate the construction zone without difficulty. Larger vehicles 101, e.g., trucks and buses, may encounter difficulty navigating construction zones. The user can tag the event 200 with prompts 215 indicating that the construction zone may be difficult to navigate, and that larger vehicles 101 should avoid the area and find an alternate route. The computer 105 can send the message to other vehicles 101 over the network 125.

Figure 4:
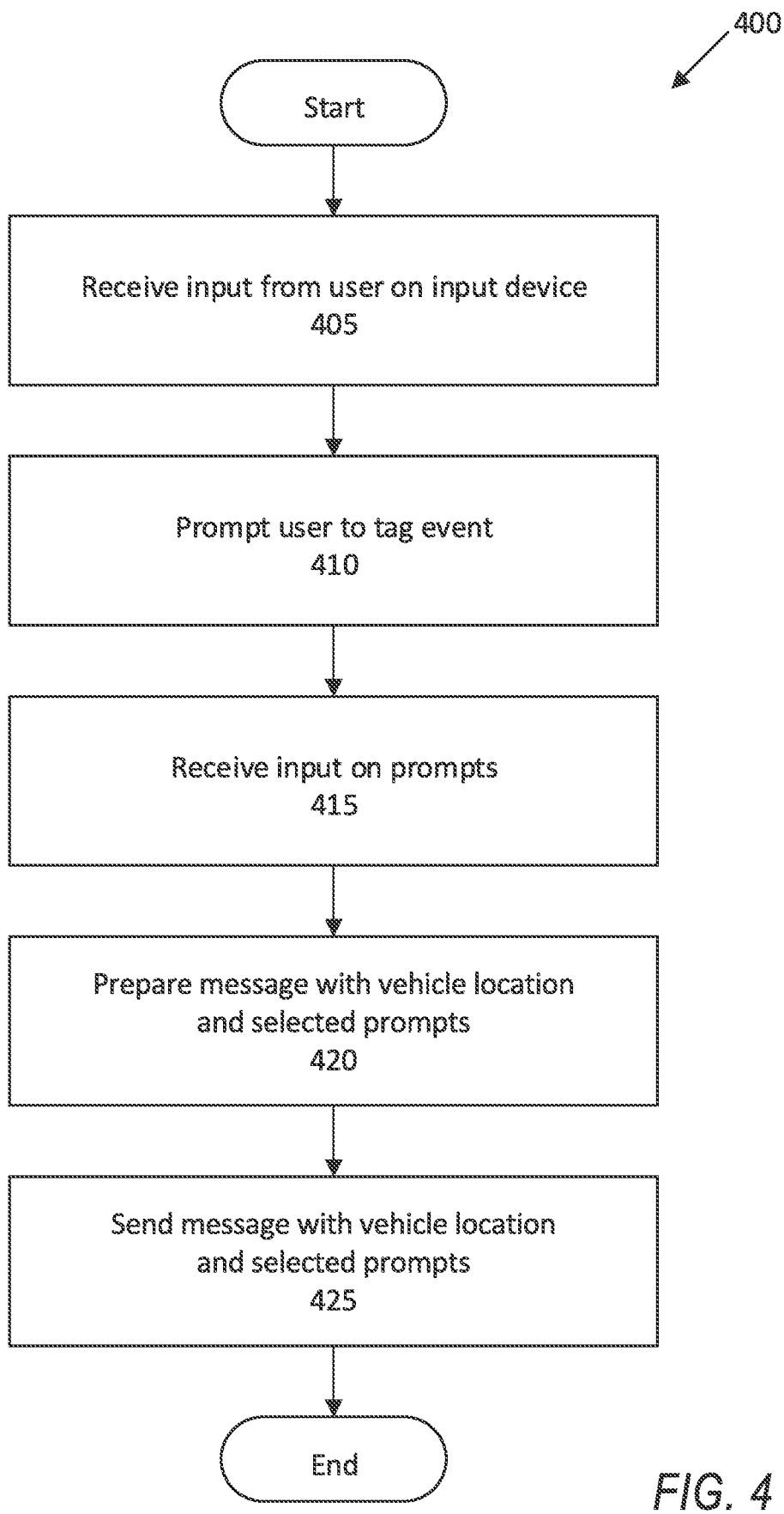
FIG. 4 is a block diagram of an example process for identifying the event with the input device.

FIG. 4 illustrates an example process 400 for identifying an event 200. The process 400 begins in a block 405, in which the user provides an input to an input device 140. As described above, the input device 140 can include one or more buttons that the user can depress to indicate that an event 200 is occurring.

Next, in a block 410, the computer 105 provides one or more prompts 215 for the user to select to identify the event 200. As described above, the input device 140 can send a notification to the computer 105 indicating that the user wants to identify an event 200. The computer 105 can then provide one or more prompts 215 on a display, e.g., a vehicle 101 HMI and/or a user device 150 display. The prompts 215 can be determined based on, e.g., a vehicle 101 size, a vehicle 101 location, etc., as shown in FIGS. 3A-3C.

Next, in a block 415, the computer 105 receives a notification indicating input from the user selecting one or more prompts 215. For example, the user device processor 155 can identify the prompts 215 selected by the user on the user device 150 display and send a notification with the identified prompts 215 to the computer 105. Alternatively or additionally, the computer 105 can identify the prompts 215 selected on the vehicle 101 HMI.

Next, in a block 420, the computer 105 prepares a message indicating the selected prompts 215. As described above, the message can include the selected prompts 215 and the vehicle 101 location to identify the event 200. Furthermore, if the computer 105 can identify the event 200 from the prompts 215, the computer 105 can include the identified event 200 in the message.

Next, in a block 425, the computer 105 sends the message over the network 125 to the server 130 and to other vehicles 101. Thus, the computer 105 can identify the event 200 and inform other vehicles 101 about the event 200. Following the block 425, the process 400 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computer 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer programmed to:
   present a plurality of prompts, each associated with a road event, on a display of a portable input device upon receiving a first input by a user of a vehicle on an input device installed in the vehicle;
   receive a second input by the user of the vehicle selecting the prompts on the portable input device to tag the road event;
   send a message with the selected prompts and a location of the vehicle;
   adjust a route of the vehicle based on the message; and
   actuate a vehicle component based on the adjustment of the route.

2. The system of claim 1, wherein the computer is further programmed to present the prompts based on a size of the vehicle.

3. The system of claim 1, wherein the input device is mounted to one of a steering wheel and an instrument panel.

4. The system of claim 1, wherein the input device includes a plurality of buttons, and each button is programmed to select one or more of the prompts.

5. The system of claim 1, wherein the computer is further programmed to select one of the prompts upon receiving the input on the input device.

6. The system of claim 1, wherein the computer is further programmed to present the prompts based on a location of the vehicle.

7. The system of claim 1, wherein the computer is further programmed to present the prompts based on data from a vehicle sensor.

8. The system of claim 1, wherein the computer is further programmed to receive a second message and, based on the second message, actuate a vehicle component.

9. The system of claim 1, further comprising a second computer in a second vehicle, the second computer programmed to actuate a second vehicle component based on receipt of the message.

10. A method, comprising:
    presenting a plurality of prompts, each associated with a road event, on a display of a portable input device in a vehicle upon receiving an input by a user of the vehicle on an input device installed in the vehicle;
    receiving a second input by the user of the vehicle selecting the prompts on the display of the portable input device;
    sending a message with the selected prompts and a location of the vehicle;
    adjusting a route of the vehicle based on the message; and
    actuating a vehicle component based on the adjustment of the route.

11. The method of claim 10, further comprising presenting the prompts based on a size of the vehicle.

12. The method of claim 10, wherein the input device is mounted to one of a steering wheel and an instrument panel.

13. The method of claim 10, wherein the input device includes a plurality of buttons, and each button is programmed to select one or more of the prompts.

14. The method of claim 10, further comprising selecting one of the prompts upon receiving the input on the input device.

15. The method of claim 10, further comprising presenting the prompts based on a location of the vehicle.

16. The method of claim 10, further comprising presenting the prompts based on data from a vehicle sensor.

17. The method of claim 10, further comprising receiving a second message and, based on the second message, actuating a vehicle component.

18. The method of claim 10, further comprising actuating a second vehicle component in a second vehicle based on receipt of the message.

* * * * *